(12) United States Patent
Takeshima

(10) Patent No.: US 8,359,948 B2
(45) Date of Patent: Jan. 29, 2013

(54) TRANSMISSION FOR INDUSTRIAL VEHICLE

(75) Inventor: Hiroaki Takeshima, Komatsu (JP)

(73) Assignee: Komatsu Ltd., Tokyo (JP)

( * ) Notice: Subject to any disclaimer, the term of this patent is extended or adjusted under 35 U.S.C. 154(b) by 780 days.

(21) Appl. No.: 12/522,275

(22) PCT Filed: Feb. 12, 2008

(86) PCT No.: PCT/JP2008/052229
§ 371 (c)(1),
(2), (4) Date: Jul. 7, 2009

(87) PCT Pub. No.: WO2008/114548
PCT Pub. Date: Sep. 25, 2008

(65) Prior Publication Data
US 2010/0043596 A1   Feb. 25, 2010

(30) Foreign Application Priority Data

Mar. 20, 2007   (JP) .................................. 2007-071971

(51) Int. Cl.
*F16H 37/06*   (2006.01)
*F16H 3/08*   (2006.01)

(52) U.S. Cl. .......................... 74/665 GA; 74/329; 74/331

(58) Field of Classification Search ................. 74/665 F, 74/665 G, 665 GA, 325, 329, 330, 331, 333, 74/335, 340
See application file for complete search history.

(56) References Cited

U.S. PATENT DOCUMENTS

| | | | |
|---|---|---|---|
| 3,802,293 A * | 4/1974 | Winckler et al. ................. | 74/745 |
| 3,858,455 A * | 1/1975 | Sisson et al. ..................... | 74/360 |
| 3,893,345 A * | 7/1975 | Sisson et al. ..................... | 74/331 |
| 3,916,710 A * | 11/1975 | Sisson et al. ..................... | 74/331 |
| 3,916,714 A * | 11/1975 | Sisson et al. ..................... | 74/331 |
| 4,031,762 A * | 6/1977 | Shellberg ..................... | 74/15.63 |
| 5,172,602 A * | 12/1992 | Jurgens et al. .................. | 74/335 |
| 5,425,283 A * | 6/1995 | Wehking .......................... | 74/331 |
| 5,592,853 A | 1/1997 | Robholz et al. | |
| 5,819,587 A | 10/1998 | Leber et al. | |
| 6,513,399 B2 * | 2/2003 | Lamela ............................ | 74/331 |
| 6,845,682 B1 * | 1/2005 | Bulgrien .......................... | 74/331 |
| 6,988,426 B2 * | 1/2006 | Calvert ............................ | 74/331 |
| 7,730,807 B2 * | 6/2010 | Kim et al. ........................ | 74/745 |

FOREIGN PATENT DOCUMENTS

| | | |
|---|---|---|
| JP | 08-504921 A | 5/1996 |
| JP | 2565596 Y2 | 12/1997 |
| JP | 10-500195 A | 1/1998 |
| JP | 2001-099246 A | 4/2001 |
| JP | 2005-282830 A | 10/2005 |

* cited by examiner

*Primary Examiner* — Troy Chambers
*Assistant Examiner* — Michael Gonzalez
(74) *Attorney, Agent, or Firm* — Global IP Counselors

(57) ABSTRACT

A transmission for an industrial vehicle has an input shaft, first and second transmission mechanisms, a clutch mechanism, a rotation direction switching gear train, a speed change gear train, and an output shaft. The first and second transmission mechanisms change the speed among a plurality of speeds of rotation from the input shaft. The clutch mechanism is disposed on the input side of the transmission mechanisms and includes forward and reverse clutches and first and second snap clutches for selecting which of the first and second transmission mechanisms will receive rotational input from the engine. The rotation direction switching gear train inputs rotations for forward and reverse travel to the forward and reverse clutches. The speed change gear train inputs to the first snap clutch and the second snap clutch the output from the forward clutch and the reverse clutch.

4 Claims, 12 Drawing Sheets

TRANSMISSION FOR INDUSTRIAL VEHICLE

CROSS-REFERENCE TO RELATED APPLICATIONS

This national phase application claims priority to Japanese Patent Application No. 2007-071971, filed on Mar. 20, 2007. The entire disclosure of Japanese Patent Application No. 2007-071971 is hereby incorporated herein by reference.

TECHNICAL FIELD

The present invention relates to a transmission for an industrial vehicle, particularly to a transmission for an industrial vehicle for changing and outputting the speed of rotation from the engine while capable of multiple speed changes during forward and reverse travel.

BACKGROUND ART

A hydraulic transmission such as that disclosed in Japanese Laid-open Patent Application No. 2005-282830 is commonly provided as a transmission for a wheel loader or another industrial vehicle. This type of transmission has a torque converter disposed between the engine and the transmission body. Disposed inside the transmission body are a hydraulic clutch for forward travel and a hydraulic clutch for reverse travel whereby a switch is made between forward and reverse travel, as well as hydraulic clutches for a plurality of speed-change steps that can operate in forward and reverse.

With such a transmission, the hydraulic clutch for forward travel is engaged (brought into a power transmission state) and the hydraulic clutch for reverse travel is disengaged (brought into a power cutoff state) during forward travel, after which the hydraulic clutch of the corresponding speed-change step is engaged so that a suitable speed-change step is selected in accordance with the travel state or the like. Conversely, the hydraulic clutch for forward travel is disengaged and the hydraulic clutch for reverse travel is engaged during reverse travel, after which the hydraulic clutch of the corresponding speed-change step is engaged so that a suitable speed-change step is selected in accordance with the travel state or the like.

In a passenger vehicle, on the other hand, a twin-clutch transmission for a vehicle is provided for rapidly switching speeds (e.g., Japanese Laid-open Patent Application No. 2001-99246). The transmission shown in Japanese Laid-open Patent Application No. 2001-99246 has a first transmission mechanism for odd-numbered speeds, a second transmission mechanism for even-numbered speeds, and first and second clutch mechanisms provided in correspondence to the respective transmission mechanisms.

In such a configuration, it is possible to rapidly change speed from an odd-numbered speed-change step to an even-numbered speed-change step because the speed change can be prepared (pre-shifted) in the second transmission mechanism for even-numbered speeds when the vehicle is travelling in an odd-numbered speed, for example.

SUMMARY OF THE INVENTION

A conventional transmission for an industrial vehicle generally uses a torque converter and a plurality of hydraulic clutches, as shown in Japanese Laid-open Patent Application No. 2005-282830. The torque converter has poor power transmission because power is transmitted using a fluid. Also, a conventional transmission has a hydraulic clutch provided to each speed-change step, so the configuration is complex, and the configuration of the oil lines for providing hydraulic pressure to the hydraulic clutch is complicated.

Therefore, it is possible to consider using a configuration such as that shown in Japanese Laid-open Patent Application No. 2001-99246, which is used as a transmission for a passenger vehicle, in a transmission for a wheel loader or another industrial vehicle.

However, in a transmission for an industrial vehicle, the reverse-movement side is similar to the forward-movement side in that a plurality of speed-change steps is required in the same manner as during forward travel, and a configuration such as that shown in Japanese Laid-open Patent Application No. 2001-99246 cannot be used without modification.

An object of the present invention is to provide a transmission for an industrial vehicle that has a simple configuration and good efficiency.

The transmission for an industrial vehicle according to a first aspect is a transmission adapted to output the speed of rotation from an engine while enabling multiple speed changes during forward and reverse travel. The transmission for an industrial vehicle includes an input shaft, a first transmission mechanism, a second transmission mechanism, a clutch mechanism, a rotation direction switching gear train, a speed change gear train, and an output shaft. The input shaft receives rotation from the engine as input. The first transmission mechanism is configured and arranged to change the speed among a plurality of speeds of rotation from the input shaft. The second transmission mechanism, provided in parallel to the first transmission mechanism, is configured and arranged to change the speed among a plurality of speeds of rotation from the input shaft. The clutch mechanism is disposed on the input side of the first and second transmission mechanisms. The clutch mechanism includes a forward clutch and a reverse clutch for switching between a forward travel state and a reverse travel state, a first snap clutch configured and arranged to input the rotation from the engine to the first transmission mechanism, and a second snap clutch configured and arranged to input the rotation from the engine to the second transmission mechanism. The rotation direction switching gear train is configured and arranged to input rotations for forward travel and reverse travel to the forward clutch and the reverse clutch. The speed change gear train is configured and arranged to input to the first snap clutch and the second snap clutch the output from the forward clutch and the reverse clutch. The output shaft is configured and arranged to output the rotation inputted from the first and second transmission mechanisms.

With this transmission, the forward clutch is engaged (brought into a power transmission state) during forward travel, and the reverse clutch is disengaged (brought into a power cutoff state) during forward travel. The rotation from the engine is inputted to an input shaft, converted to the direction of rotation for forward travel by the rotation direction switching gear train, and inputted to the forward clutch. The output of the forward clutch is inputted to the first snap clutch or the second snap clutch via the speed change gear train, and then inputted to the first transmission mechanism or the second transmission mechanism. Conversely, the forward clutch is disengaged during reverse travel, the reverse clutch is engaged during reverse travel, and the rotation from the input shaft is converted to the direction of rotation for reverse travel by the rotation direction switching gear train and inputted to the reverse clutch. Similarly, the output of the reverse clutch is inputted to the first transmission mechanism or the second transmission mechanism via the speed change gear train and the first snap clutch or the second snap clutch. In a case in which the speed is changed by input to the first transmission mechanism during forward or reverse travel, the first snap clutch is engaged and the second snap clutch is disengaged. Conversely, when the speed is changed by input to the second transmission mechanism, the first snap clutch is disengaged and the second snap clutch is engaged.

In this arrangement, a clutch mechanism is provided to the pre-stage of the transmission mechanism, whereby a plurality of speed-change steps can be obtained during forward travel and reverse travel using a single set of transmission mechanisms. Also, the speed-change steps can be rapidly changed in forward and reverse travel.

Also, with the transmission mechanism having a configuration such as that described above, the configuration of the transmission mechanisms can be simplified in comparison with a conventional transmission because the transmission mechanisms can be generally configured using a dog clutch.

The transmission for an industrial vehicle according to a second aspect is the transmission for an industrial vehicle as recited in the first aspect, further including a counter shaft arranged parallel to the input shaft. The first and second transmission mechanisms have first and second speed-change shafts, respectively, arranged parallel to the input shaft. The forward clutch is arranged coaxially with the input shaft. The reverse clutch is arranged coaxially with the counter shaft. The first snap clutch is arranged coaxially with the first speed-change shaft. The second snap clutch is arranged coaxially with the second speed-change shaft.

In this case, space in the horizontal and vertical directions can be made the same as that of the transmission for an industrial vehicle such that as described in Japanese Laid-open Patent Application No. 2005-282830. In other words, a conventional transmission has an input shaft, a first speed-change shaft, and a second speed-change shaft, as well as a counter shaft for reverse travel; and each of the shafts has a hydraulic clutch. In the present invention, a forward clutch is provided coaxially with the input shaft, a reverse clutch is provided coaxially with the counter shaft, and first and second snap clutches are provided coaxially with the first and second speed-change shafts. Therefore, even if the clutch mechanisms are configured using hydraulic clutches in the same manner as in the prior art, space in the horizontal and vertical directions will not be increased.

The transmission for an industrial vehicle according to a third aspect is the transmission for an industrial vehicle as recited in the second aspect, wherein the rotation direction switching gear train has a first gear fixed to the input shaft, and a second gear fixed to the counter shaft and meshing with the first gear.

In this case, the rotation from the engine inputted to the input shaft is inputted directly to the forward clutch arranged coaxially with the input shaft. On the other hand, the rotation from the engine is inputted to the counter shaft via the first gear and the second gear, and the rotation in the opposite direction of the input shaft is inputted to the reverse clutch disposed on the counter shaft.

Here, in a simple configuration, rotation for forward travel is inputted to the Forward clutch, and rotation for reverse travel is inputted to the reverse clutch.

The transmission for an industrial vehicle according to a fourth aspect is the transmission for an industrial vehicle as recited in the second or third aspect, wherein the speed change gear train has a forward gear, a reverse gear, a first speed change gear, and a second speed change gear. The forward gear is rotatably supported by the input shaft and configured and arranged to transmit the output from the forward clutch to the first and second transmission mechanisms. The reverse gear is rotatably supported by the counter shaft and configured and arranged to transmit the output from the reverse clutch to the first and second transmission mechanisms. The first speed change gear is rotatably supported by the first speed-change shaft and meshes with the forward gear and the reverse gear, and configured and arranged to input the rotation from the forward and reverse gears to the first snap clutch. The second speed change gear is rotatably supported by the second speed-change shaft and meshes with the forward gear and the reverse gear, and configured and arranged to input the rotation from the forward and reverse gears to the second snap clutch.

With this transmission, the forward clutch is engaged (brought into a power transmission state) and the reverse clutch is disengaged (brought into a power cutoff state) during forward travel. Conversely, the forward clutch is disengaged and the reverse clutch is engaged during reverse travel. In a case in which the speed is changed by input to the first transmission mechanism during forward or reverse travel, the first snap clutch is engaged and the second snap clutch is disengaged. Conversely, when the speed is changed by input to the second transmission mechanism, the first snap clutch is disengaged and the second snap clutch is engaged.

In this case, output from the forward clutch is inputted to the first snap clutch by the meshing of the forward gear and the first speed change gear, and is inputted to the first transmission mechanism. Also, the output is inputted to the second snap clutch by the meshing of the forward gear and the second speed change gear, and is inputted to the second transmission mechanism. On the other hand, the output of the reverse clutch is inputted to the first snap clutch by the meshing of the reverse gear and the first speed change gear, and is inputted to the first transmission mechanism. Also, the output is inputted to the second snap clutch by the meshing of the reverse gear and the second speed change gear, and is inputted to the second transmission mechanism.

In this case as well, a plurality of speed-change steps can be changed in the same manner during forward travel as well as reverse travel using the first and second transmission mechanisms by switching the forward clutch and the reverse clutch and switching the first snap clutch and the second snap clutch.

The transmission for an industrial vehicle according to a fifth aspect is the transmission for an industrial vehicle as recited in any of the first to fourth aspects, further including a main clutch device, disposed between the engine and the clutch mechanism, configured and arranged to transmit the rotation from the engine to the input shaft.

In this case, the engine power can be transmitted with good efficiency because the rotation from the engine is transmitted to the transmission mechanisms by a main clutch device rather than a torque converter. The main clutch device can control the clutch capacity by controlling the hydraulic pressure of the clutch in the case of a hydraulic clutch, for example. Therefore, engine stoppage under a rapid increase in load or at other times can be avoided by reducing the clutch capacity of the main clutch device.

DETAILED DESCRIPTION OF THE PREFERRED EMBODIMENTS

Overall Structure

Figure 1:
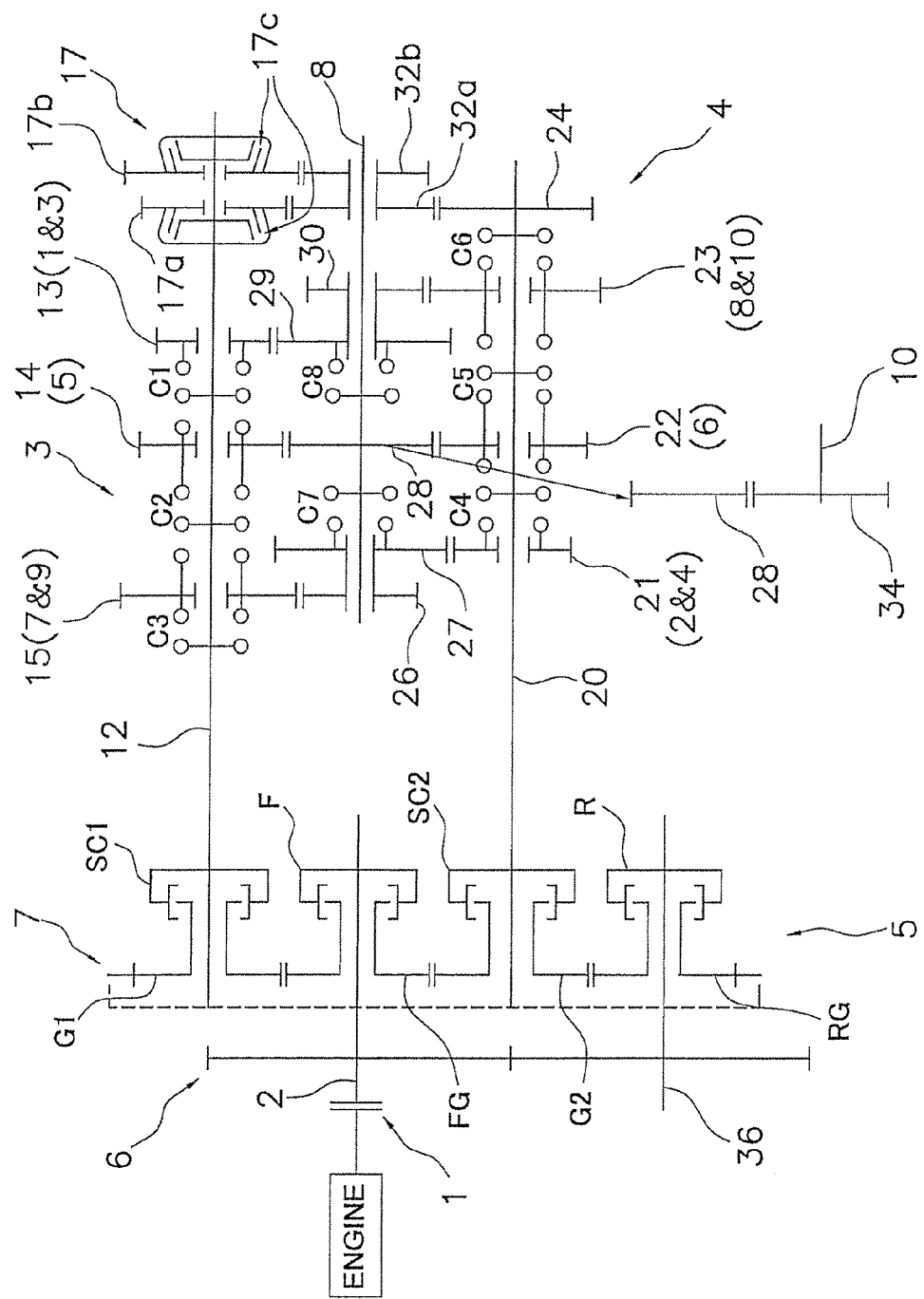
FIG. 1 is a skeleton view of the transmission for a wheel loader in which an embodiment of the present invention has been used.
Figure 2:
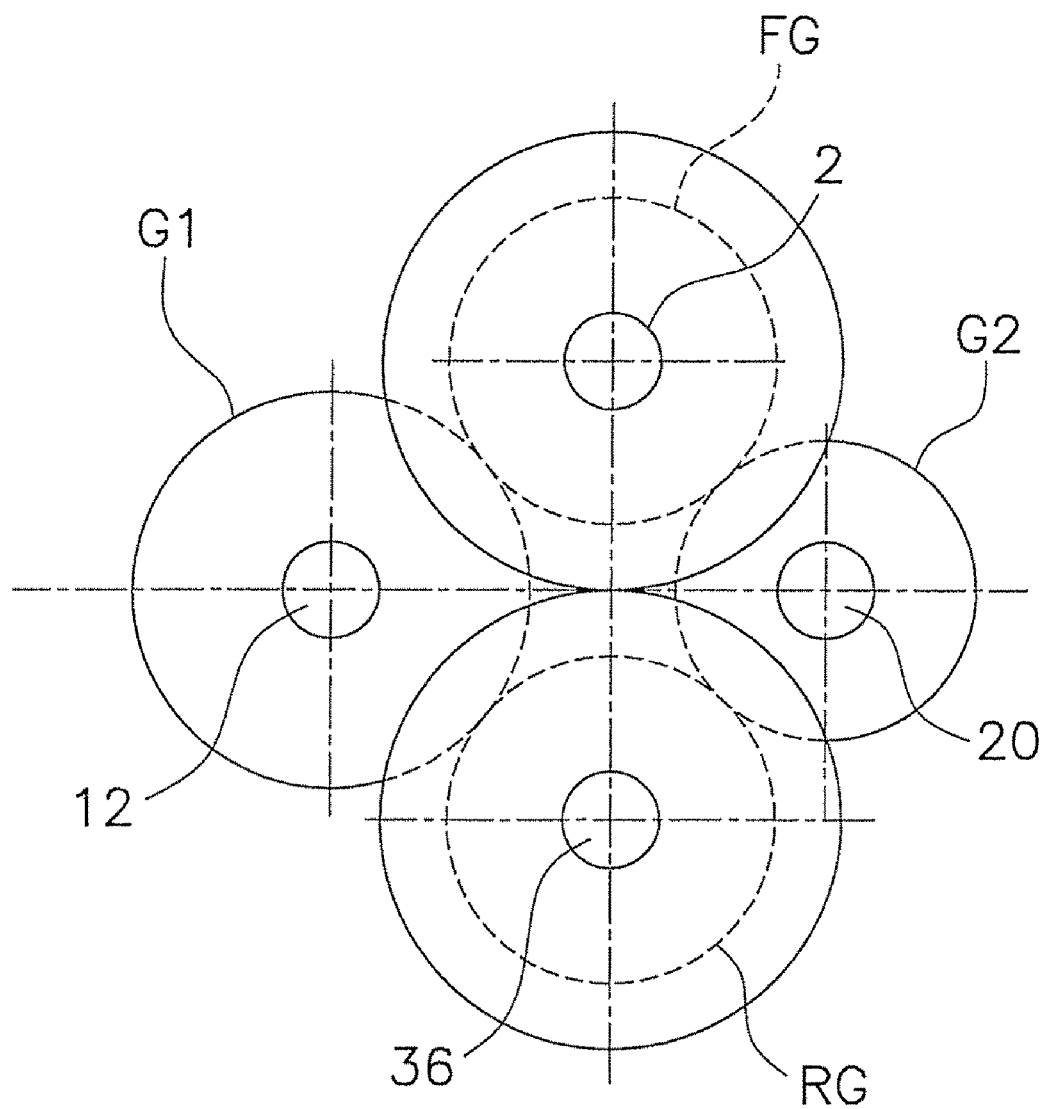
FIG. 2 is a general schematic view as seen from the rear of the transmission.
Figure 3:
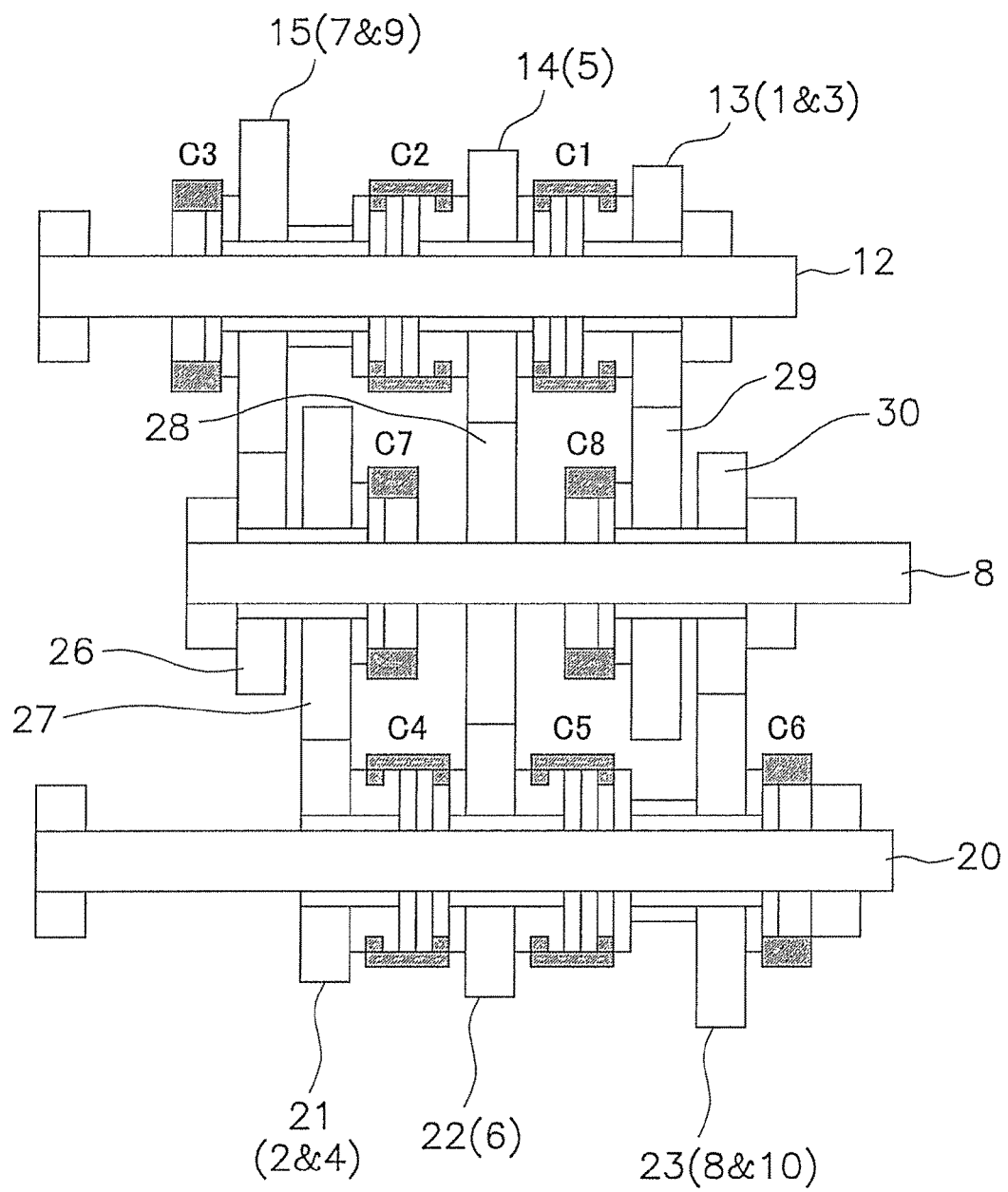
FIG. 3 is schematic view showing the structure of the first transmission mechanism and the second transmission mechanism of the transmission.

FIG. 1 is a skeleton view of the transmission according to an embodiment of the present invention. FIG. 2 is a general schematic view of the shafts and the like as seen from the engine side of the transmission. FIG. 3 is a schematic partial view of the transmission mechanism. In FIG. 2, only the arrangement of some of the shafts and the like is shown, and the configuration of the output shaft and the like has been omitted.

The transmission shown in FIG. 1 is installed, e.g., in a wheel loader, and is provided with ten speed-change steps for both forward and reverse travel. The transmission has a main clutch 1 to which rotation from the engine is inputted, an input shaft 2 to which the engine rotation is inputted via the main clutch 1, a first transmission mechanism 3, a second transmission mechanism 4, a clutch mechanism 5, a rotation direction switching gear train 6, a speed change gear train 7, and an output shaft 10. A speed-changing idle shaft 8 is disposed between the output shaft 10 and the first and second transmission mechanisms 3, 4.

Main Clutch and Input Shaft

The main clutch 1 is a hydraulic clutch that can control the clutch capacity by controlling the hydraulic pressure of the clutch. The input shaft 2 is rotatably supported by a pair of bearings (not shown) in the transmission housing.

First Transmission Mechanism

The first transmission mechanism 3 receives rotation as input when an odd-numbered step (1st and 3rd speeds, 5th speed, and 7th and 9th speeds) is selected from among ten speed-change steps; has a first speed-change shaft 12, first- and third-speed (hereinafter referred to as 1st- and 3rd-speed) drive gears 13, a fifth-speed (hereinafter referred to as 5th-speed) drive gear 14, and seventh- and ninth-speed (hereinafter referred to as 7th- and 9th-speed) drive gears 15; and further has first to third dog clutches C1, C2, C3.

The first speed-change shaft 12 is offset from the input shaft 2, is disposed in parallel to the input shaft 2, and is rotatably supported by a pair of bearings in the housing. The 1st- and 3rd-speed drive gears 13, the 5th-speed drive gear 14, and the 7th- and 9th-speed drive gears 15 are each rotatably supported by a pair of bearings on the first speed-change shaft 12.

The dog clutches C1 to C3 are clutches that move in the axial direction and are designed either to relatively nonrotatably fix the drive gears 13 to 15 to the first speed-change shaft 12 or to link two drive gears to each other. The third dog clutch C3 is constantly kept in a state of being incapable of rotating relative to the first speed-change shaft 12, and the first and second dog clutches C1, C2 can assume a position in which the clutches are incapable of rotating relative to the first speed-change shaft 12, or a position in which the clutches are capable of rotating relative to the shaft.

Specifically, the first dog clutch C1 is a clutch for switching between engaging (linking) the first speed-change shaft 12 and the 1st- and 3rd-speed drive gears 13 with each other, engaging the 1st- and 3rd-speed drive gears 13 with the 5th-speed drive gear 14, and disengaging (not linking) these elements from each other. The second dog clutch C2 is a clutch for switching between engaging the first speed-change shaft 12 and the 5th-speed drive gear 14 with each other, engaging the 5th-speed drive gear 14 with the 7th- and 9th-speed drive gears 15, and disengaging these elements from each other. The third dog clutch C3 is a clutch for switching between engaging and disengaging the first speed-change shaft 12 and the 7th- and 9th-speed drive gears 15.

Furthermore, a synchronizing mechanism 17 for ensuring a smooth meshing of the dog clutches during speed change is provided to the first speed-change shaft 12. The synchronizing mechanism 17 has a first synchronizing gear 17a and a second synchronizing gear 17b that are relatively rotatably supported on the first speed-change shaft 12, and a cone clutch 17c for linking the synchronizing gears 17a, 17b and the first speed-change shaft 12.

Second Transmission Mechanism

The second transmission mechanism 4 receives rotation as input when an even-numbered step (second and fourth speeds, sixth speed, and eighth and tenth speeds) is selected from among ten speed-change steps; has a second speed-change shaft 20, second- and fourth-speed (hereinafter referred to as 2nd- and 4th-speed) drive gears 21, a sixth-speed (hereinafter referred to as 6th-speed) drive gear 22, and eighth and tenth speed (hereinafter referred to as eighth and tenth speeds) drive gears 23; and also has fourth to sixth dog clutches C4, C5, C6.

The second speed-change shaft 20 is offset from the input shaft 2, is disposed in parallel to the input shaft 2 and the first speed-change shaft 12, and is rotatably supported by a pair of bearings in the housing. The 2nd- and 4th-speed drive gears 21, the 6th-speed drive gear 22, and the 8th- and 10th-speed drive gears 23 are each rotatably supported by a pair of bearings on the second speed-change shaft 20.

The fourth to sixth dog clutches C4, C5, C6 are clutches that move in the axial direction and are designed either to fix (make incapable of relative rotation) the drive gears 21 through 23 to the second speed-change shaft 20, or to link two drive gears to each other. The sixth dog clutch C6 is constantly kept in a state of being incapable of rotating relative to the second speed-change shaft 20, and the fourth and fifth dog clutches C4, C5 can assume a position in which the clutches are incapable of rotating relative to the second speed-change shaft 20, or a position in which the clutches are capable of rotating relative to the shaft.

Specifically, the fourth dog clutch C4 is a clutch for switching between engaging the second speed-change shaft 20 with the 2nd- and 4th-speed drive gears 21, engaging the 2nd- and 4th-speed drive gears 21 with the 6th-speed drive gear 22, and disengaging these elements from each other. The fifth dog clutch C5 is a clutch for switching between engaging the second speed-change shaft 20 and the 6th-speed drive gear 22, engaging the 6th-speed drive gear 22 with the 8th- and 10th-speed drive gears 23, and disengaging these elements from each other, The sixth dog clutch C6 is a clutch for switching between engaging and disengaging the second speed-change shaft 20 and the 8th- and 10th-speed drive gears 23.

A synchronizing gear 24 for actuating the synchronization is fixed to the second speed-change shaft 20 of the second transmission mechanism 4.

Speed-Changing Idle Shaft

The speed-changing idle shaft 8 is rotatably supported by a pair of bearings in the housing in the same manner as the speed-change shafts 12, 20, and is disposed parallel to the first and second speed-change shafts 12, 20. The speed-changing idle shaft 8 is provided with the seventh and eighth drive clutches C7, C8, as well as a driven gear that meshes with the drive gears provided to the first and second transmission mechanisms 3, 4. More specifically, first to fifth driven gears 26, 27, 28, 29, 30 are rotatably supported in sequence from the engine by the speed-changing idle shaft 8 via bearings. The first driven gear 26 and the second driven gear 27 are configured so as to integrally rotate with each other, and the fourth driven gear 29 and the fifth driven gear 30 are configured so as to integrally rotate with each other. The driven gear 26 constantly meshes with the 7th- and 9th-speed drive gears 15, the second driven gear 27 with the 2nd- and 4th-speed drive gears 21, the third driven gear 28 with the 5th-speed drive gear 14 and the 6th-speed drive gear 22, the fourth driven gear 29 with the 1st- and 3rd-speed drive gears 13, and the fifth driven gear 30 with the 8th- and 10th-speed drive gears 23, respectively.

The seventh and eighth dog clutches C7, C8 are clutches that move in the axial direction and are desired to relatively nonrotatably fix the driven gears to the speed-changing idle shaft 8. The seventh and eighth dog clutches C7, C8 are constantly kept in a state of being incapable of rotating relative to the speed-changing idle shaft 8.

Specifically, the seventh dog clutch C7 is a clutch for engaging or disengaging the speed-changing idle shaft 8 with or from the first and second driven gears 26, 27; and the eighth dog clutch C8 is a clutch for engaging or disengaging the speed-changing idle shaft 8 with or from the fourth and fifth driven gears 29, 30.

A first idling and synchronizing gear 32a that meshes with the synchronizing gear 24, and a second idling and synchronizing gear 32b integrally formed with the first idling and synchronizing gear 32a are rotatably supported by the rear end (the end on the side opposite from the engine) of the speed-changing idle shaft 8. The first idling and synchronizing gear 32a meshes with the first synchronizing gear 17a, and the second idling and synchronizing gear 32b meshes with the second synchronizing gear 17b.

Output Shaft

The output shaft 10 is rotatably supported by a pair of bearings in the housing in the same manner as other shafts. The output shaft 10 is disposed below the shafts and parallel to the shafts. An output gear 34 is fixed to the output shaft 10, and the output gear 34 meshes with the third driven gear 28.

Clutch Mechanism

The clutch mechanism 5 has a forward clutch F and a reverse clutch R for switching between forward and reverse travel, as well as a first snap clutch SC1 for selecting the first transmission mechanism 3, and a second snap clutch SC2 for selecting the second transmission mechanism 4. The forward clutch F is disposed coaxially with the input shaft 2. The reverse clutch R is disposed coaxially with a counter shaft 36 that is arranged parallel to the input shaft 2. The first snap clutch SC1 is disposed coaxially with the first speed-change shaft 12, and the second snap clutch SC2 is disposed coaxially with the second speed-change shaft 20. These clutches are composed of hydraulic multidisc clutches, but are not particularly limited to this configuration.

Here, the forward gear FG is rotatably supported by the input shaft 2, and a reverse gear RG is rotatably disposed on the counter shaft 36. The first speed change gear G1 is rotatably disposed on the first speed-change shaft 12, and the second speed change gear G32 is rotatably disposed on the second speed-change shaft 20. The forward gear FG and the reverse gear RG mesh with the first speed change gear G1 and the second speed change gear G2, respectively, as shown in FIG. 2.

The forward clutch F transmits power (engages) and cuts off power (disengages) between the input shaft 2 and the forward gear FG, and the reverse clutch R transmits power (engages) and cuts off power (disengages) between the counter shaft 36 and the reverse gear RG. The first snap clutch SC1 transmits power (engages) and cuts off power (disengages) between the first speed change gear G1 and the first speed-change shaft 12, and the second snap clutch SC2 transmits power (engages) and cuts off power (disengages) between the second speed change gear G2 and the second speed-change shaft 20.

Rotation Direction Switching Gear Train

The rotation direction switching gear train 6 is composed of an input gear 6a fixed to the input shaft 2, and a counter gear 6b fixed to the counter shaft 36 and meshed with the input gear 6a.

In such a configuration, the rotation inputted to the input shaft 2 is inputted to the forward clutch F in the unchanged direction of rotation, and the direction of rotation is converted to the opposite direction by the meshing of the gears 6a, 6b and is inputted to the reverse clutch R.

Speed Change Gear Train

The speed change gear train 7 is composed of the above-described forward gear FG, reverse gear RG, first speed change gear G1, and second speed change gear G2.

With such a configuration, the direction of rotation outputted from the forward clutch F is converted to the opposite direction by the meshing of the forward gear FG and the first speed change gear G1, and is inputted to the first snap clutch SC1; and the direction of rotation is converted to the opposite direction and is inputted to the second snap clutch SC2 by the meshing of the forward gear FG and the second speed change gear G2. Therefore, the output of the forward clutch F in inputted as (forward) rotation in the same direction to the first and second snap clutches SC1, SC2. The direction of rotation outputted from the reverse clutch R is converted to the opposite direction by the meshing of the reverse gear RG and the first speed change gear G1, and is inputted to the first snap clutch SC1; and the direction of rotation is converted to the opposite direction and inputted to the second snap clutch SC2 by the meshing of the reverse gear RG and the second speed change gear G2. Therefore, the output of the reverse clutch R in inputted as (reverse) rotation in the same direction to the first and second snap clutches SC1, SC2.

Power Transmission Pathway: Input-Side Shared Pathway

Next, the power transmission pathway of the transmission configured as described above will be described. First described is the shared pathway for each speed-change step, i.e., the power transmission pathway firm the input shaft 2 to the transmission mechanisms 3, 4.

Forward Clutch Engaged & First Snap Clutch Engaged

In a case in which the forward clutch F and the first snap clutch SC1 are engaged (the reverse clutch R and second snap clutch SC2 are disengaged), rotation from the input shaft 2 is transmitted to the first snap clutch SC1 via the forward clutch F, the forward gear FG, and the first speed change gear G1, and the rotation is inputted to the first speed-change shaft 12 of the first transmission mechanism 3.

Assuming that the direction of rotation of the engine is the first direction (the same applies for all directions hereinafter), the corresponding direction of rotation is the first direction for the input shaft 2 and the forward gear FG, and the direction of rotation of the first speed change gear G1 and the first speed-change shaft 12 is the second direction (forward).

Forward Clutch Engaged & Second Snap Clutch Engaged

In a case in which the forward clutch F and the second snap clutch SC2 are engaged (the reverse clutch R and first snap clutch SC1 are disengaged), rotation from the input shaft 2 is inputted to the second snap clutch SC2 via the forward clutch F, the forward gear FG, and the second speed change gear G2, and the rotation is inputted to the second speed-change shaft 20 of the second transmission mechanism 4.

Assuming that the direction of rotation of the engine is the first direction, the corresponding direction of rotation is the first direction for the input shaft 2 and the forward gear FG, and the direction of rotation of the second speed change gear G2 and the second speed-change shaft 20 is the second direction (forward).

Reverse Clutch Engaged & First Snap Clutch Engaged

In a case in which the reverse clutch R and the first snap clutch SC1 are engaged (the forward clutch F and second snap clutch SC2 are disengaged), rotation from the input shaft 2 is transmitted to the reverse clutch R via the input gear 6a, the counter gear 6b, and the counter shaft 36; inputted to the first snap clutch SC1 via the reverse gear RG and the first speed change gear G1; and inputted to the first speed-change shaft 12 of the first transmission mechanism 3.

Assuming that the direction of rotation of the engine is the first direction, the corresponding direction of rotation is the second direction for the counter gear 6b and the counter shaft 36, and the direction of rotation of the first speed change gear G1 and the first speed-change shaft 12 is the first direction (reverse).

Reverse Clutch Engaged & Second Snap Clutch Engaged

In a case in which the reverse clutch R and the second snap clutch SC2 are engaged (the forward clutch F and first snap clutch SC1 are disengaged), rotation from the input shaft 2 is inputted to the reverse clutch R via the input gear 6a, the counter gear 6b, and the counter shaft 36; inputted to the second snap clutch SC2 via the reverse gear RG and the second speed change gear G2; and inputted to the second speed-change shaft 20 of the second transmission mechanism 4.

Assuming that the direction of rotation of the engine is the first direction, the corresponding direction of rotation is the second direction for the counter gear 6b and the counter shaft 36, and the direction of rotation of the second speed change gear G2 and the second speed-change shaft 20 is the first direction (reverse).

Power Transmission Pathway: Speed-Change Steps

The speed of the rotation inputted to the first and second transmission mechanisms 3, 4 is thus changed in the manner described below for each speed-change step.

Forward First Speed

Figure 4:
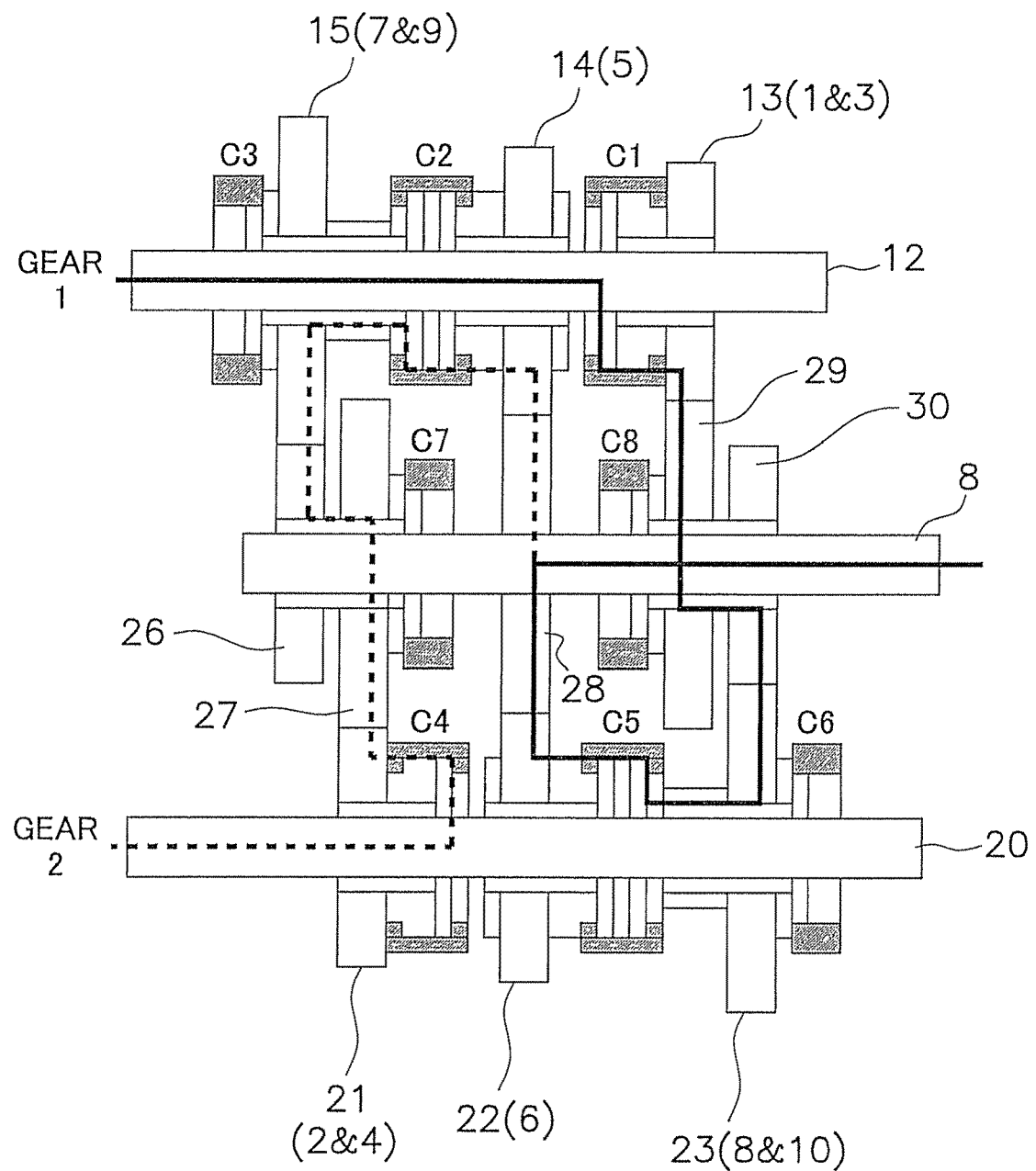
FIG. 4 is a schematic view showing the power transmission pathway in each speed-change step of the transmission.

In the case of the forward first speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward first speed, the dog clutches are controlled so that the following members are engaged (linked) with each other, as shown in FIG. 4.

First dog clutch C1: first speed-change shaft 12+1st- and 3rd-speed drive gears 13

Second dog clutch C2: 5th-speed drive gear 14+7th- and 9th-speed drive gears 15

Fourth dog clutch C4: second speed-change shaft 20+2nd- and 4th-speed drive gears 21

Fifth dog clutch C5: 6th-speed drive gear 22+8th- and 10th-speed drive gears 23

Other dog clutches: disengaged

In this arrangement, the rotation inputted to the first speed-change shaft 12 is transmitted to the speed-changing idle shaft 8 via the pathway described below. The power transmission pathway is shown by a solid line in FIG. 4. The rotation transmission pathway of the second transmission mechanism 4 in this case is indicated by a dotted line. The pathway indicated by the dotted line is the rotation transmission pathway of second speed and indicates that pre-shifting has been performed.

First speed-change shaft 12→first dog clutch C1→1st- and 3rd-speed drive gears 13→fourth and fifth driven gears 29, 30→8th- and 10th-speed drive gears 23→fifth dog clutch C5→6th-speed drive gear 22→third driven gear 28→speed-changing idle shaft 8

Forward Second Speed

Figure 5:
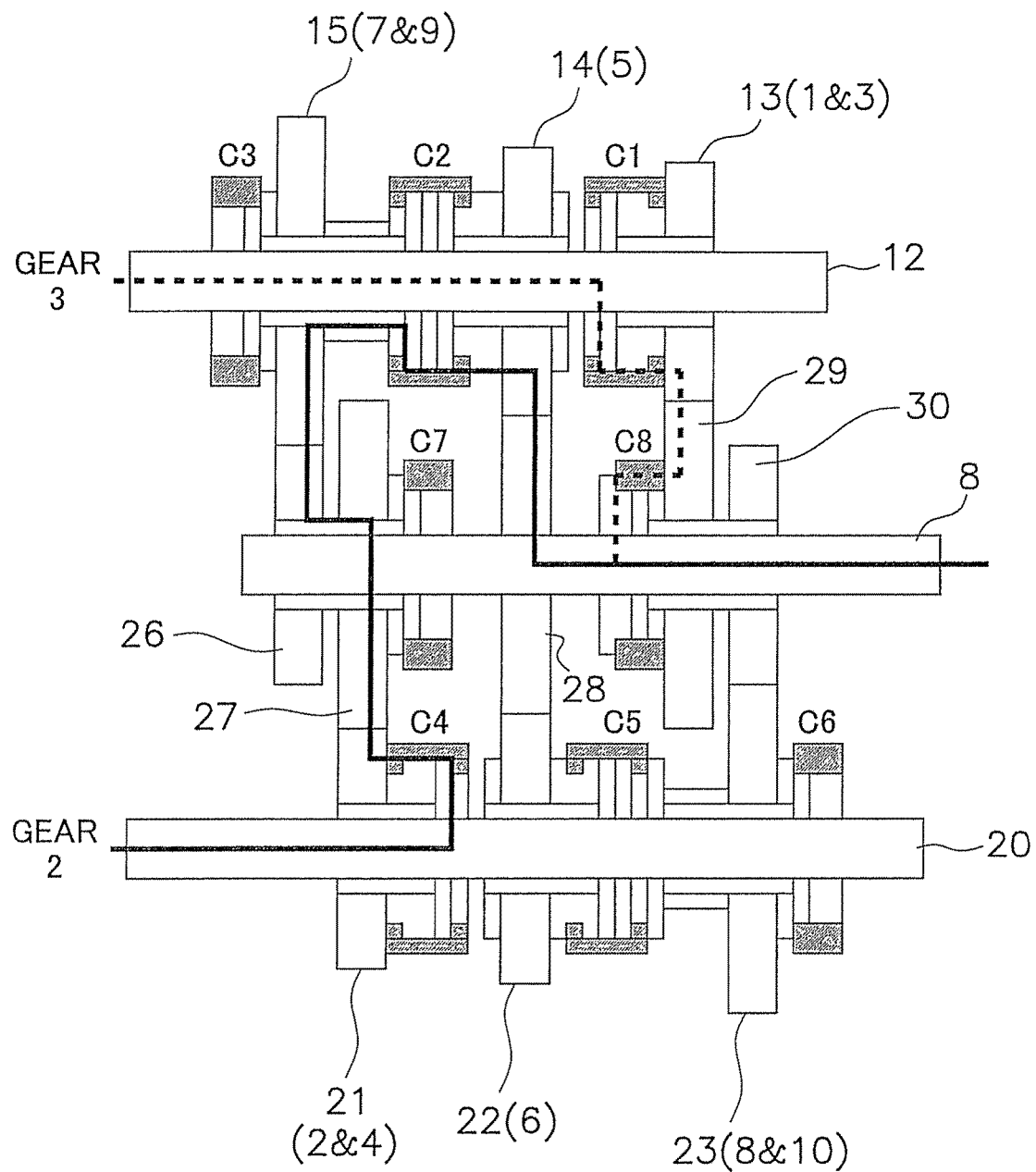
FIG. 5 is a schematic view showing the power transmission pathway in each speed-change step of the transmission.

In the case of the forward second speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward second speed, the dog clutches are controlled so that the following members are engaged (linked) with each other, as shown in FIG. 5.

First dog clutch C1: first speed-change shaft 12+1st- and 3rd-speed drive gears 13

Second dog clutch C2: 5th-speed drive gear 14+7th- and 9th-speed drive gears 15

Fourth dog clutch C4: second speed-change shaft 20+2nd- and 4th-speed drive gears 21

Eighth dog clutch C8: fourth driven gear 29+speed-changing idle shaft 8

Other dog clutches: disengaged

In this arrangement, the rotation inputted to the second speed-change shaft 20 is transmitted to the speed-changing idle shaft 8 via the following pathway. The power transmission pathway is shown by a solid line in FIG. 5. The rotation transmission pathway of the first transmission mechanism 3 in this case is indicated by a dotted line. The pathway indicated by the dotted line is the rotation transmission pathway of third speed and indicates that pre-shifting has been performed.

Second speed-change shaft 20→fourth dog clutch C4→2nd- and 4th-speed drive gears 21→first and second driven gears 26, 27→7th- and 9th-speed drive gears 15→second dog clutch C2→5th-speed drive gear 14→third driven gear 28→speed-changing idle shaft 8

Forward Third Speed

Figure 6:
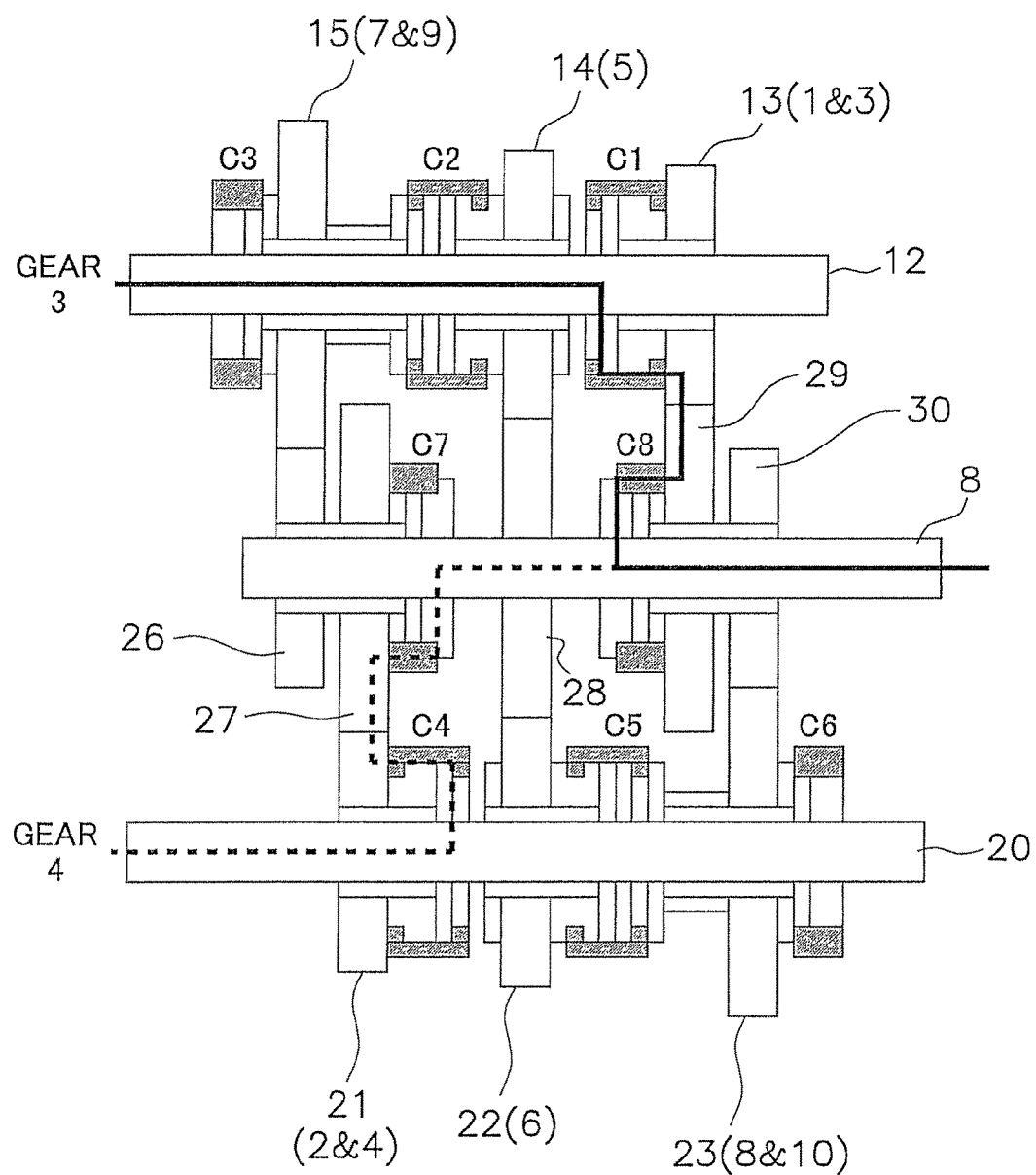
FIG. 6 is a schematic view showing the power transmission pathway in each speed-change step of the transmission.

In the case of the forward third speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward third speed, the dog clutches are controlled so that the following members are engaged (linked) with each other, as shown in FIG. 6.

First dog clutch C1: first speed-change shaft 12+1st- and 3rd-speed drive gears 13

Fourth dog clutch C4: second speed-change shaft 20+2nd- and 4th-speed drive gears 21

Seventh dog clutch C7: second driven gear 27+speed-changing idle shaft 8

Eighth dog clutch C8: fourth driven gear 29+speed-changing idle shaft 8

Other dog clutches: disengaged

In this arrangement, the rotation inputted to the first speed-change shaft 12 is transmitted to the speed-changing idle shaft 8 via the following pathway. The power transmission pathway is shown by a solid line in FIG. 6. The rotation transmission pathway of the second transmission mechanism 4 in this case is indicated by a dotted line. The pathway indicated by the dotted line is the rotation transmission pathway of fourth speed and indicates that pre-shifting has been performed.

First speed-change shaft 12→first dog clutch C1→1st- and 3rd-speed drive gears 13→fourth driven gear 29→eighth dog clutch C8→speed-changing idle shaft 8

Forward Fourth Speed

Figure 7:
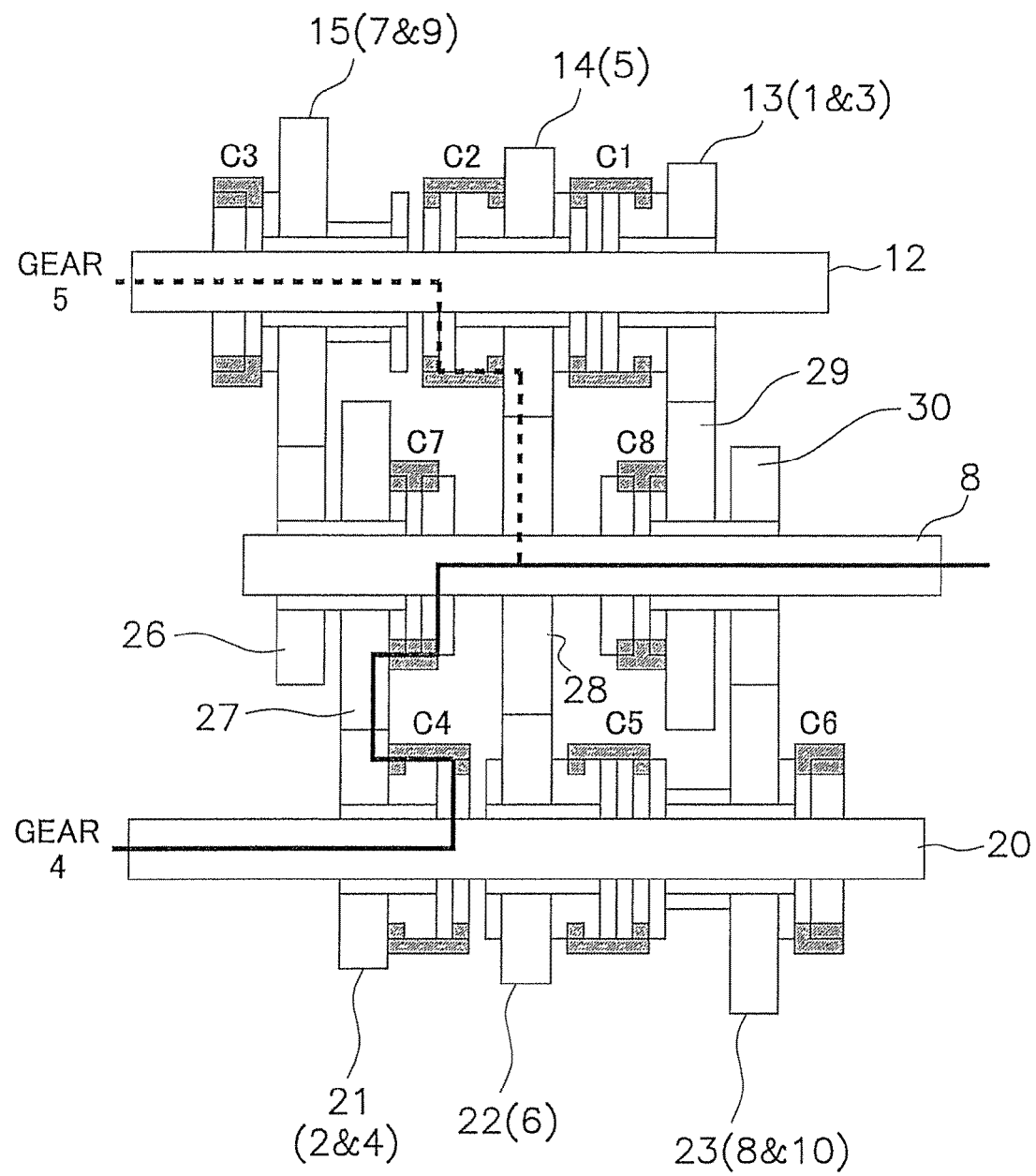
FIG. 7 is a schematic view showing the power transmission pathway in each speed-change step of the transmission.

In the case of the forward fourth speed, the forward clutch F and the second snap) clutch SC2 are engaged and the reverse clutch R and the first snap clutch SC1 are disengaged. In this case, the rotation in the second direction is inputted to the second speed-change shaft 20 as described above. In forward fourth speed, the dog clutches are controlled so that the following members are engaged (linked) with each other, as shown in FIG. 7.

Second dog clutch C2: first speed-change shaft 12+5th-speed drive gear 14

Fourth dog clutch C4: second speed-change shaft 20+2nd- and 4th-speed drive gears 21

Seventh dog clutch C7: second driven gear 27+speed-changing idle shaft 8

Other dog clutches: disengaged

In this arrangement, the rotation inputted to the second speed-change shaft 20 is transmitted to the speed-changing idle shaft 8 via the following pathway. The power transmission pathway is shown by a solid line in FIG. 7. The rotation transmission pathway of the first transmission mechanism 3 in this case is indicated by a dotted line. The pathway indicated by the dotted line is the rotation transmission pathway of fifth speed and indicates that pre-shifting has been performed.

Second speed-change shaft 20→fourth dog clutch C4→2nd- and 4th-speed drive gears 21→second driven gear 27→seventh dog clutch C7→speed-changing idle shaft 8

Forward Fifth Speed

Figure 8:
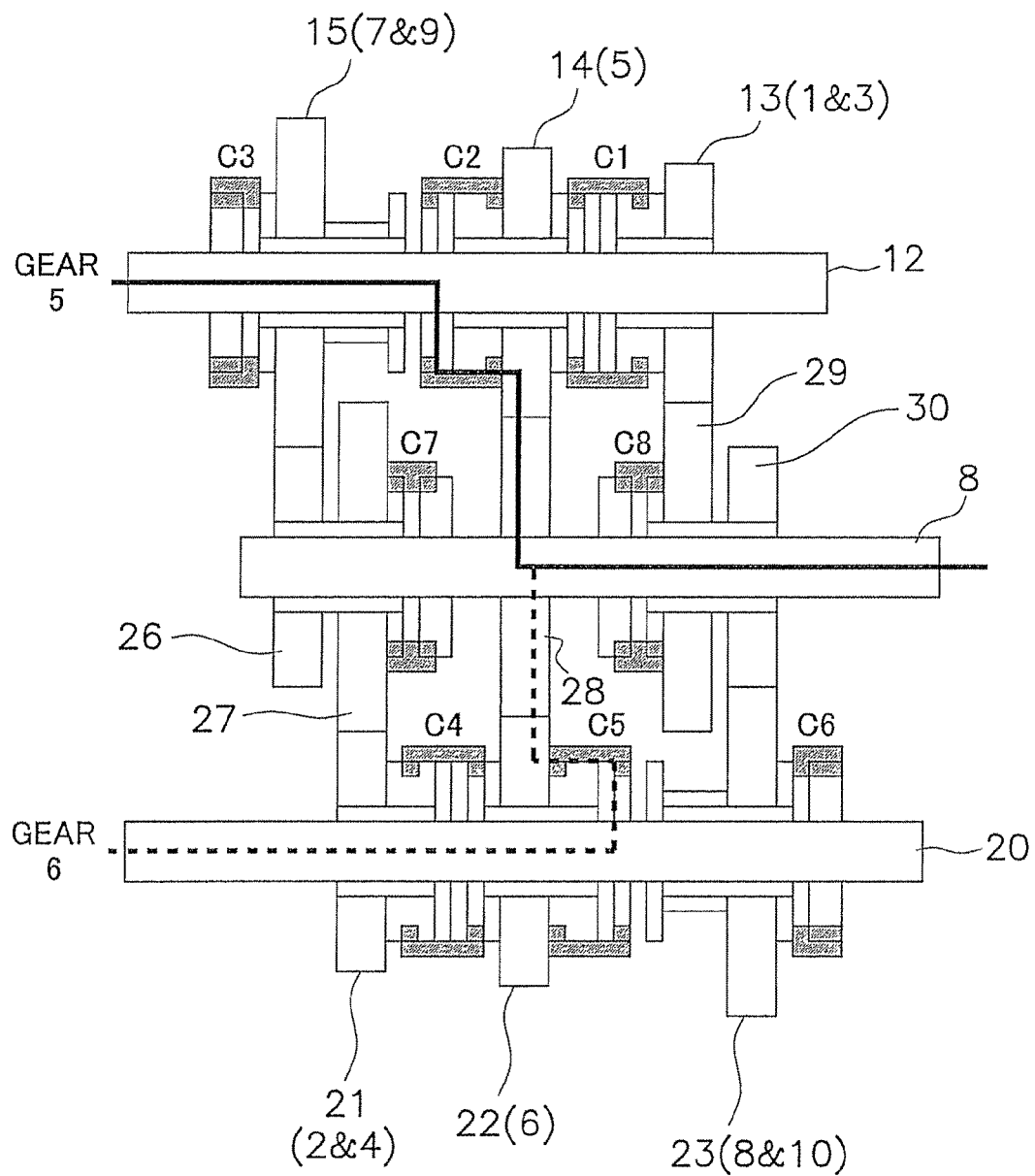
FIG. 8 is a schematic view showing the power transmission pathway in each speed-change step of the transmission.

In the case of the forward fifth speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward fifth speed, the dog clutches are controlled so that the following members are engaged (linked) with each other, as shown in FIG. 8.

Second dog clutch C2: first speed-change shaft 12+5th-speed drive gear 14

Fifth dog clutch C5: second speed-change shaft 20+6th-speed drive gear 22

Other dog clutches: disengaged

In this arrangements the rotation inputted to the first speed-change shaft 12 is transmitted to the speed-changing idle shaft 8 via the following pathway. The power transmission pathway is shown by a solid line in FIG. 8. The rotation transmission pathway of the second transmission mechanism 4 in this case is indicated by a dotted line. The pathway indicated by the dotted line is the rotation transmission pathway of sixth speed and indicates that pre-shifting has been performed.

First speed-change shaft 12→second dog clutch C2→5th-speed drive gear 14→third driven gear 28→speed-changing idle shaft 8

Forward Sixth Speed

Figure 9:
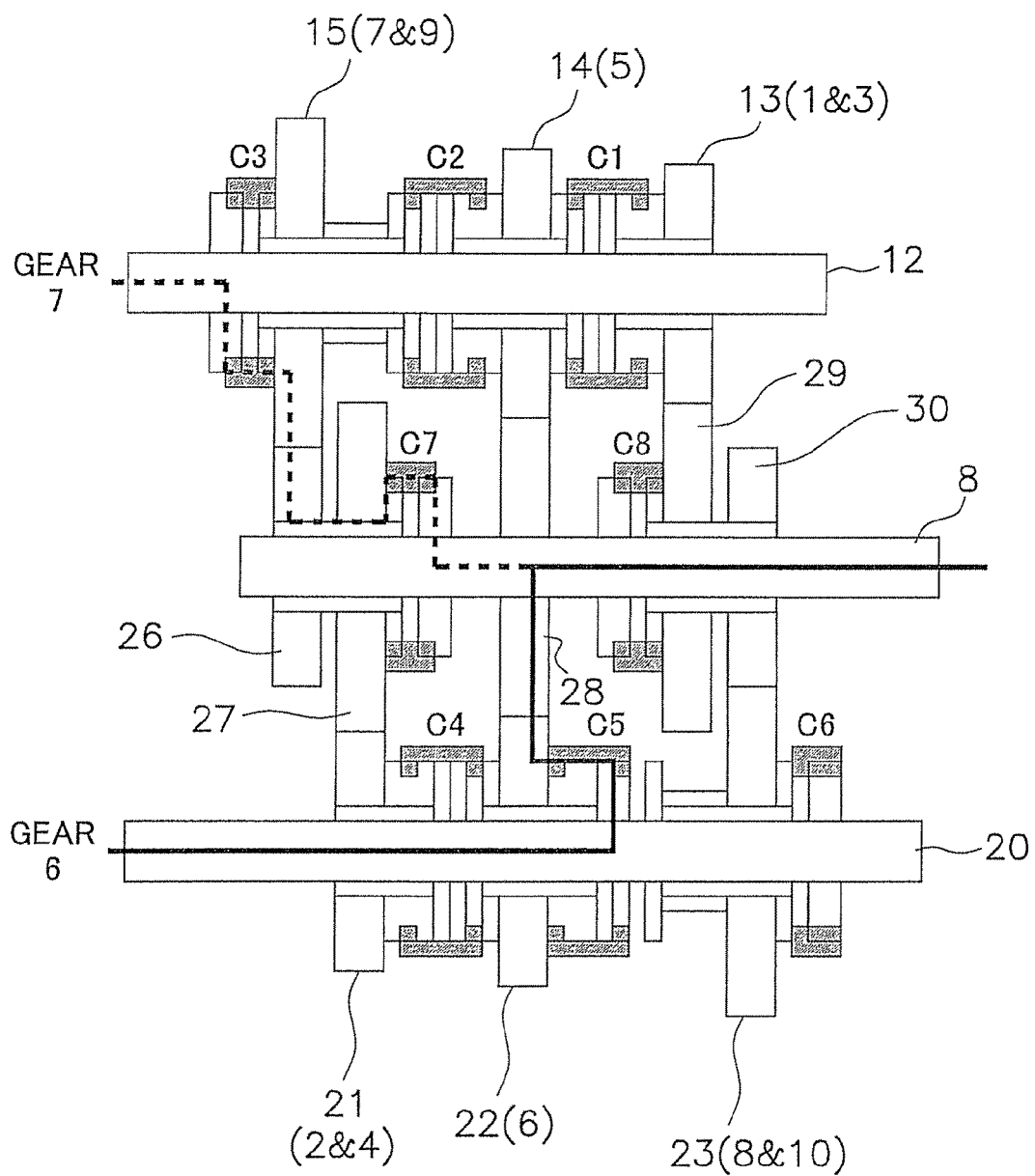
FIG. 9 is a schematic view showing the power transmission pathway in each speed-change step of the transmission.

In the case of the forward sixth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward sixth speed, the dog clutches are controlled so that the following members are engaged (linked) with each other, as shown in FIG. 9.

Third dog clutch C3: first speed-change shaft 12+7th- and 9th-speed drive gears 15

Fifth dog clutch C5: second speed-change shaft 20+6th-speed drive gear 22

Seventh dog clutch C7: first and second driven gears 26, 27+speed-changing idle shaft 8

Other dog clutches: disengaged

In this arrangement, the rotation inputted to the second speed-change shaft 20 is transmitted to the speed-changing idle shaft 8 via the following pathway. The power transmission pathway is shown by a solid line in FIG. 9. The rotation transmission pathway of the first transmission mechanism 3 in this case is indicated by a dotted line. The pathway indicated by the dotted line is the rotation transmission pathway of seventh speed and indicates that pre-shifting has been performed.

Second speed-change shaft 20→fifth dog clutch C5→6th-speed drive gear 22→third driven gear 28→speed-changing idle shaft 8

Forward Seventh Speed

Figure 10:
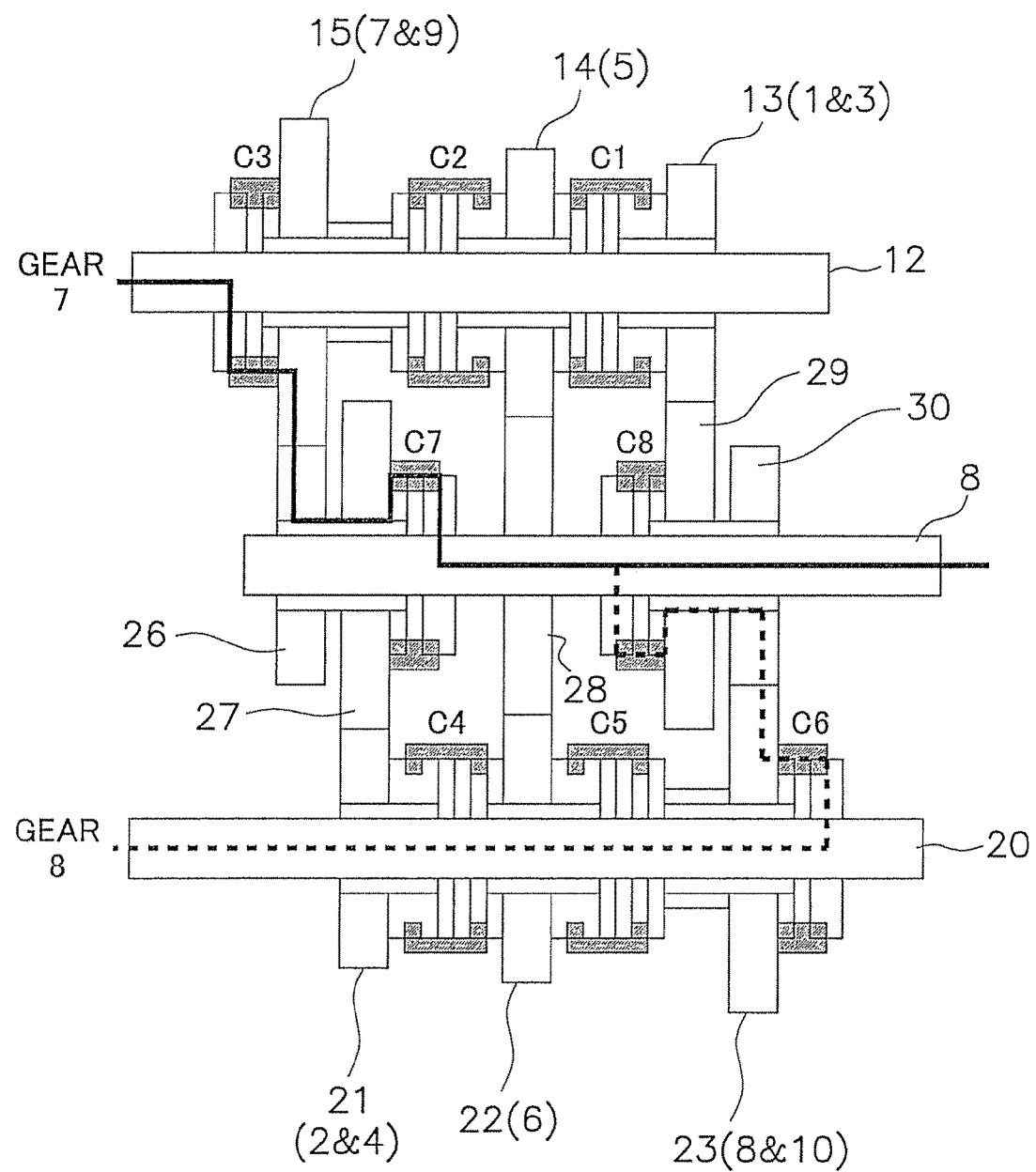
FIG. 10 is a schematic view showing the power transmission pathway in each speed-change step of the transmission.

In the case of the forward seventh speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward seventh speed, the dog clutches are controlled so that the following members are engaged (linked) with each other, as shown in FIG. 10.

Third dog clutch C3: first speed-change shaft 12+7th- and 9th-speed drive gears

Sixth dog clutch C6: second speed-change shaft 20+8th- and 10th-speed drive gears 23

Seventh dog clutch C7: first and second driven gears 26, 27+speed-changing idle shaft 8

Other dog clutches: disengaged

In this arrangement, the rotation inputted to the first speed-change shaft 12 is transmitted to the speed-changing idle shaft 8 via the following pathway. The power transmission pathway is shown by a solid line in FIG. 10. The rotation transmission pathway of the second transmission mechanism 4 in this case is indicated by a dotted line. The pathway indicated by the dotted line is the rotation transmission pathway of eighth speed and indicates that pre-shifting has been performed.

First speed-change shaft 12→third dog clutch C3→7th- and 9th-speed drive gears 15→first and second driven gears 26, 27→seventh dog clutch C7→speed-changing idle shaft 8

Forward Eighth Speed

Figure 11:
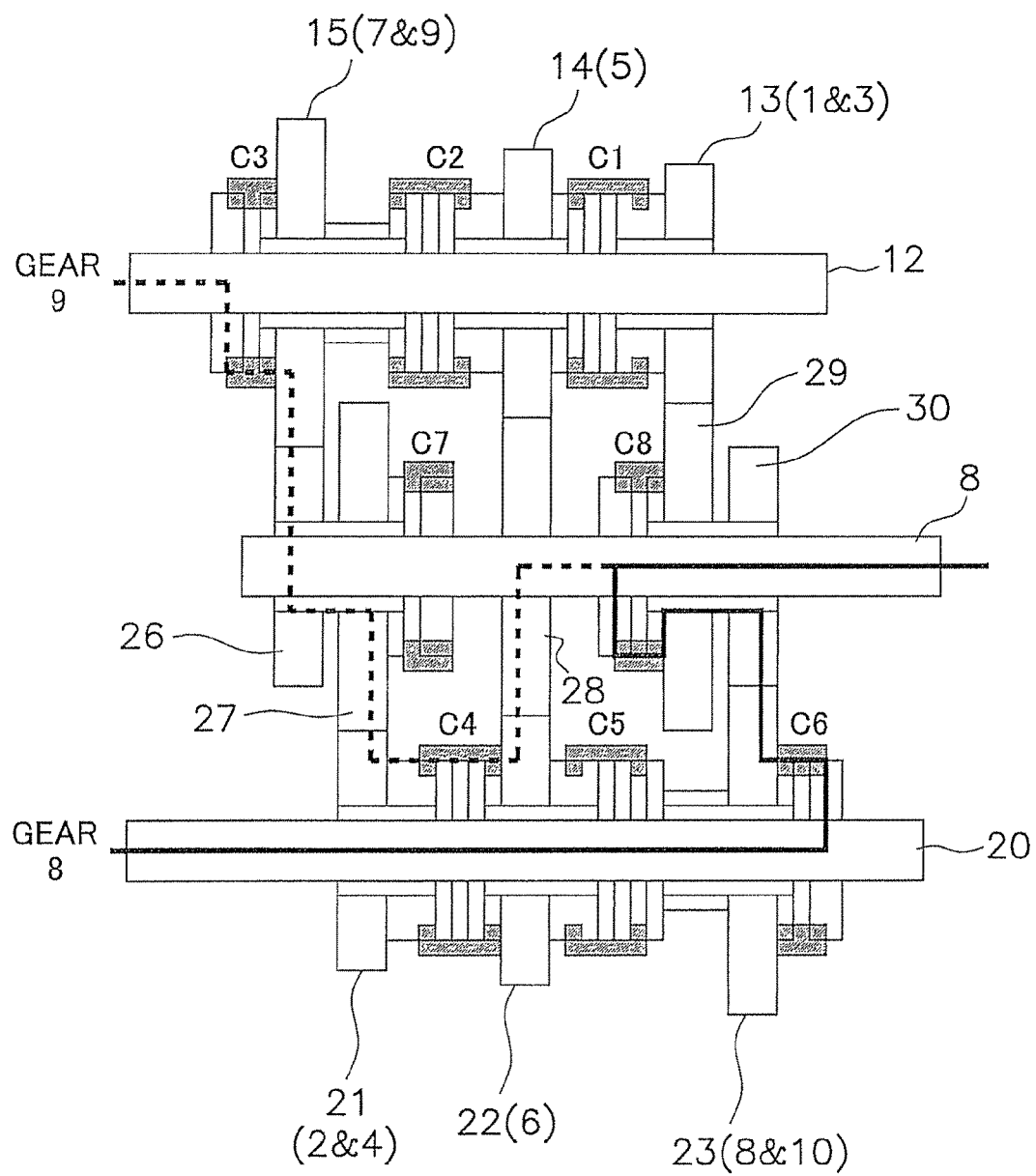
FIG. 11 is a schematic view showing the power transmission pathway in each speed-change step of the transmission.

In the case of the forward eighth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward eighth speed, the dog clutches are controlled so that the following members are engaged (linked) with each other, as shown in FIG. 11.

Third dog clutch C3: first speed-change shaft 12+7th- and 9th-speed drive gears 15

Fourth dog clutch C4: 2nd- and 4th-speed drive gears 21+6th-speed drive gear 22

Sixth dog clutch C6: second speed-change shaft 20+8th- and 10th-speed drive gears 23

Eighth dog clutch C8: fourth and fifth driven gears 29, 30+speed-changing idle shaft 8

Other dog clutches: disengaged

In this arrangement, the rotation inputted to the second speed-change shaft 20 is transmitted to the speed-changing idle shaft 8 via the following pathway. The power transmission pathway is shown by a solid line in FIG. 11. The rotation transmission pathway of the first transmission mechanism 3 in this case is indicated by a dotted line. The pathway indicated by the dotted line is the rotation transmission pathway of ninth speed and indicates that pre-shifting has been performed.

Second speed-change shaft 20→sixth dog clutch C6→8th- and 10th-speed drive gears 23→fourth and fifth driven gears 29, 30→eighth dog clutch C8→speed-changing idle shaft 8

Forward Ninth Speed

Figure 12:
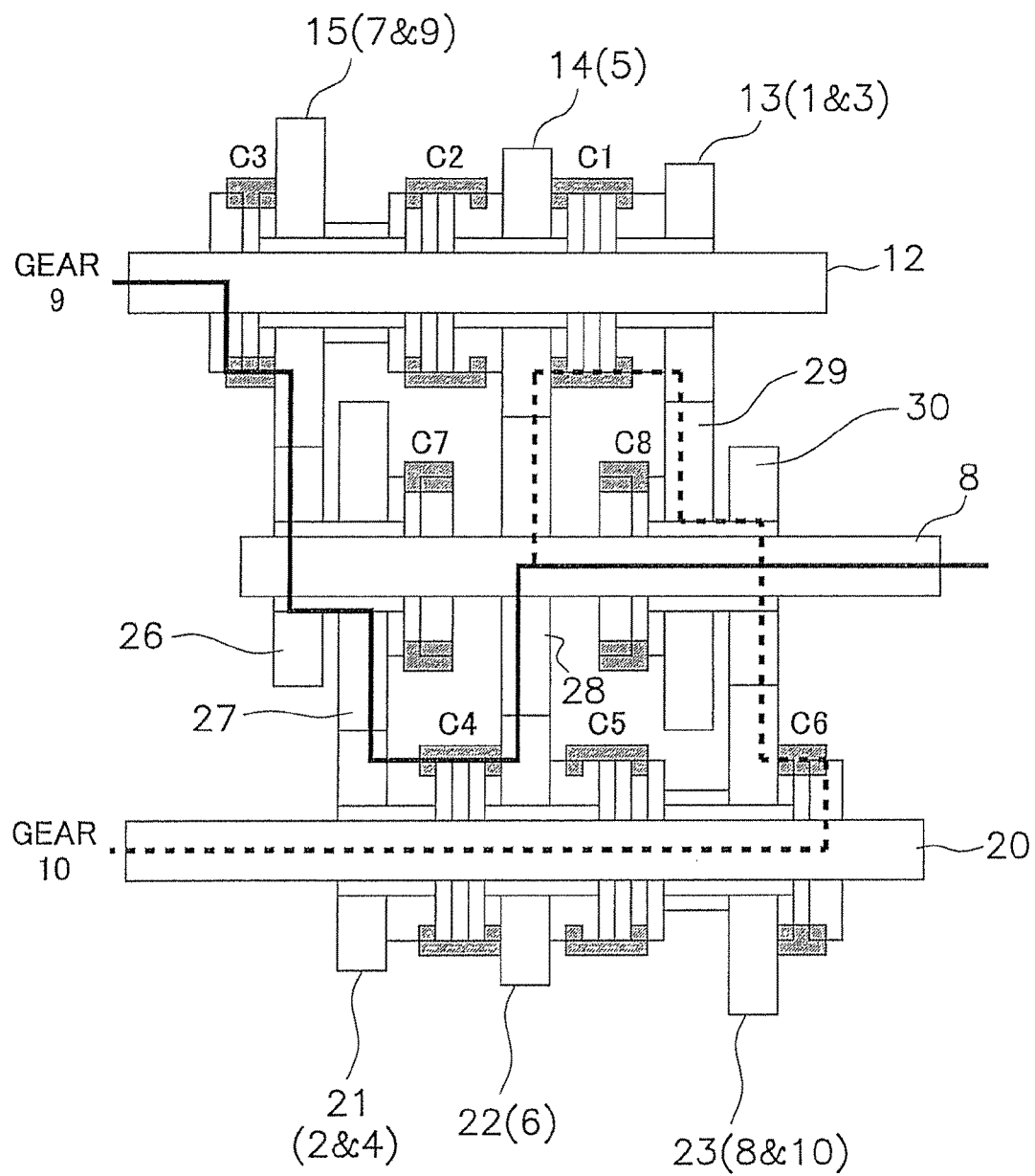
FIG. 12 is a schematic view showing the power transmission pathway in each speed-change step of the transmission.

In the case of the forward ninth speed, the forward clutch F and the first snap clutch SC1 are engaged and the reverse clutch R and the second snap clutch SC2 are disengaged. In this case, the rotation in the second direction is inputted to the first speed-change shaft 12 as described above. In forward ninth speed, the dog clutches are controlled so that the following members are engaged (linked) with each other, as shown in FIG. 12.

First dog clutch C1: 1st- and 3rd-speed drive gears 13+5th-speed drive gear 14

Third dog clutch C3: first speed-change shaft 12+7th- and 9th-speed drive gears 15

Fourth dog clutch C4: 2nd- and 4th-speed drive gears 21+6th-speed drive gear 22

Sixth dog clutch C6: second speed-change shaft 20+8th- and 10th-speed drive gears 23

Other dog clutches: disengaged

In this arrangement, the rotation inputted to the first speed-change shaft 12 is transmitted to the speed-changing idle shaft 8 via the following pathway. The power transmission pathway is shown by a solid line in FIG. 12. The rotation transmission pathway of the second transmission mechanism 4 in this case is indicated by a dotted line. The pathway indicated by the dotted line is the rotation transmission pathway of tenth speed and indicates that pre-shifting has been performed.

First speed-change shaft 12→third dog clutch C3→7th- and 9th-speed drive gears 15→first and second driven gears 26, 27→2nd- and 4th-speed drive gears 21→fourth dog clutch C4→6th-speed drive gear 22→third driven gear 28→speed-changing idle shaft 8

Forward Tenth Gear

In the case of the forward tenth speed, the forward clutch F and the second snap clutch SC2 are engaged and the reverse clutch R and the first snap clutch SC1 are disengaged. In this case, the rotation in the second direction is inputted to the second speed-change shaft 20 as described above. In forward tenth speed, the dog clutches are engaged and disengaged in the same manner as forward ninth gear.

In this arrangement, the rotation inputted to the second speed-change shaft 20 is transmitted to the speed-changing idle shaft 8 via the following pathway. The rotation transmission pathway of the first transmission mechanism 3 in this case is the same as that of forward ninth gear.

Second speed-change shaft 20→sixth dog clutch C6→8th- and 10th-speed drive gears 23→fourth and fifth driven gears 29, 30→1st- and 3rd-speed drive gears 13→>first dog clutch C1→>5th-speed drive gear 14→third driven gear 28→speed-changing idle shaft 8

Reverse First Through Tenth Speeds

In the case of reverse travel, the situation is different in that the forward clutch F is disengaged and the reverse clutch R is engaged. Therefore, in the case of reverse travel, rotation in the opposite direction of that of forward travel is inputted to the first speed-change shaft 12 and the second speed-change shaft 20, but control of the dog clutches and the power transmission pathway at each speed step is exactly the same as that that of each speed-change step for forward travel.

Power Transmission Pathway: Output-Side Shared Pathway

The rotation thus outputted to the speed-changing idle shaft 8 in each speed-change step is transmitted to the output gear 34 for meshing with the third driven gear 28 of the speed-changing idle shaft 8, and is outputted to the output shaft 10.

Concerning Synchronization During Speed Change

In the present embodiment, rotation is inputted to the first transmission mechanism 3 in odd-numbered speed-change steps, and rotation is inputted to the second transmission mechanism 4 in even-numbered speed-change steps, as described above. Pre-shifting is carried out in the transmission mechanism for moving to the next speed-change step when the speed is changed one speed at a time, and the dog clutches are smoothly meshed using the synchronizing mechanism 17 when a speed change is made to the next speed-change step.

Following is a simple description of the synchronization operation during a speed change. For example, when the speed is changed from sixth speed to fifth speed and then to fourth speed, power is transmitted in sixth speed along a pathway (dotted line) such as that shown in FIG. 8. In the sixth speed, the rotation transmission pathway of fifth speed is prepared by the first transmission mechanism 3. In other words, a pre-shift is performed. Therefore, a speed change can be executed by merely disengaging the second snap clutch SC2 and engaging the first snap clutch SC1 when a change is made from sixth speed to fifth speed. The rotation transmission pathway in fifth speed is shown by a solid line in FIG. 8.

Next, the synchronizing mechanism 17 must perform synchronization when the speed is changed from fifth speed to fourth speed. In other words, the fifth dog clutch C5 that had been linking the second speed-change shaft 20 and the 6th-speed drive gear 22 is first disengaged when fifth speed is selected. The synchronizing mechanism 17 is thereafter momentarily actuated, and the rotational speed of the second speed-change shaft 20 is brought to the same or nearly the same level as the rotational speed maintained when the fourth speed has been selected.

After such synchronization has been carried out, the fourth dog clutch C4 is engaged, and the second speed-change shaft 20 and the 2nd- and 4th-speed drive gears 21 are linked. At this point, the fourth dog clutch C4 can be made to smoothly mesh because the rotational speed of the second speed-change shaft 20 is controlled by the synchronization carried out by the synchronizing mechanism 17 as described above. The first snap clutch SC1 is subsequently disengaged and the second snap clutch SC2 is engaged. Power is thereby transmitted via the pathway shown by the solid line in FIG. 7, and the change to fourth speed is completed.

Synchronization is carried out by essentially the same operation as that described above during other speed change operations, and smooth speed changing is made possible.

Effects of the Present Embodiment

With this device, ten speed-change steps can be obtained during forward travel as well as during reverse travel using a single set of transmission mechanisms 3, 4 by providing the pre-stage of the transmission mechanism with two snap clutches SC1, SC2 and a single pair of clutches F, R for switching between forward and reverse travel.

In this case, it is also possible to consider providing the pre-stage of the transmission mechanism with a planetary gear mechanism for switching the direction of rotation as a mechanism for obtaining a plurality of speed-change steps in forward and reverse travel, but the present embodiment provides a configuration in which less space can be used in the axial direction and the size of the overall device can be reduced in comparison with the case in which a planetary gear mechanism is provided. This device can be made the same size as a conventional transmission without increasing the size in the lateral and vertical directions (the directions orthogonal to the shafts). In other words, a conventional transmission has an input shaft, a counter shaft, a first speed-change shaft, and a second speed-change shaft, and each of the shafts has a hydraulic clutch. In the present device, space in the lateral and vertical directions is similarly not increased.

Since the transmission mechanisms 3, 4 are configured using dog clutches rather than hydraulic clutches such as in a conventional device, the configuration is simplified in comparison with a conventional transmission.

In the present embodiment, each forward and reverse speed can be smoothly and rapidly changed because pre-shifting is performed during the speed change of each speed-change step, and synchronization is carried out by the synchronizing mechanism 17.

In this device, there are relatively few portions that mesh with the gear and transmission efficiency is improved in the power transmission pathway of each speed-change step.

In this device, the engine and the transmission are linked using a hydraulic clutch rather than a torque converter. Therefore, the power of the engine can be transmitted with good efficiency.

Other Embodiments (a) In the embodiment described above, an example of ten steps in forward and reverse travel was described, but the number of speed-change steps is not limited to the one specified in the embodiment.

(b) The presence of a synchronizing mechanism and the configuration of the clutches including the dog clutches are not limited to those specified in the embodiment described above.

In accordance with the embodiments described above, a transmission for an industrial vehicle that has a simple configuration and good efficiency can be obtained.

The invention claimed is:

1. A transmission for an industrial vehicle adapted to output rotation from an engine while enabling multiple speed changes during forward and reverse travel, the transmission for an industrial vehicle comprising:
   an input shaft to which rotation from the engine is inputted;
   a first transmission mechanism including a first speed-change shaft and a plurality of gears, and configured and arranged to change the speed of rotation from the input shaft among a plurality of speeds;
   a second transmission mechanism, provided in parallel to the first transmission mechanism, including a second speed-change shaft and a plurality of gears, and configured and arranged to change the speed of rotation from the input shaft among a plurality of speeds;
   a clutch mechanism disposed on an input side of the first and second transmission mechanisms and provided with a forward clutch and a reverse clutch for switching between a forward travel state and a reverse travel state, a first snap clutch for inputting the rotation from the engine to the first speed-change shaft of the first transmission mechanism, and a second snap clutch for inputting the rotation from the engine to the second speed-change shaft of the second transmission mechanism;

a rotation direction switching gear train configured and arranged to input rotations for forward travel and reverse travel to the forward clutch and the reverse clutch;

a speed change gear train configured and arranged to input to the first snap clutch and the second snap clutch output from the forward clutch and the reverse clutch;

an output shaft configured and arranged to output the rotation inputted from the first and second transmission mechanisms; and a counter shaft arranged parallel to the input shaft, the first and second speed-change shafts being arranged parallel to the input shaft, the forward clutch being arranged coaxially with the input shaft, the reverse clutch being arranged coaxially with the counter shaft, the first snap clutch being arranged coaxially with the first speed-change shaft, and the second snap clutch being arranged coaxially with the second speed-change shaft.

2. The transmission for an industrial vehicle as recited in claim 1, wherein the rotation direction switching gear train has a first gear fixed to the input shaft, and a second gear fixed to the counter shaft and meshing with the first gear.

3. The transmission for an industrial vehicle as recited in claim 1, wherein the speed change gear train has a forward gear, rotatably supported by the input shaft, configured and arranged to transmit to the first and second transmission mechanisms the output from the forward clutch, a reverse gear, rotatably supported by the counter shaft, configured and arranged to transmit to the first and second transmission mechanisms the output from the reverse clutch, a first speed change gear rotatably supported by the first speed-change shaft and meshing with the forward gear and the reverse gear, and configured and arranged to input to the first snap clutch the rotation from the forward and reverse gears, and a second speed change gear, rotatably supported by the second speed-change shaft and meshing with the forward gear and the reverse gear, and configured and arranged to input to the second snap clutch the rotation from the forward and reverse gears.

4. The transmission for an industrial vehicle as recited in claim 1, further comprising a main clutch device, disposed between the engine and the clutch mechanism, configured and arranged to transmit the rotation from the engine to the input shaft.

* * * * *